(12) United States Patent
Kelly et al.

(10) Patent No.: US 12,454,951 B2
(45) Date of Patent: Oct. 28, 2025

(54) WEAR RESISTANT FLUID ENDS

(71) Applicant: Kennametal Inc., Latrobe, PA (US)

(72) Inventors: Mike Kelly, Anaheim, CA (US);
Joshua Singley, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 1566 days.

(21) Appl. No.: 16/516,003

(22) Filed: Jul. 18, 2019

(65) Prior Publication Data

US 2021/0017981 A1 Jan. 21, 2021

(51) Int. Cl.
  *F04B 53/10* (2006.01)
  *F04B 53/16* (2006.01)
  *F04B 53/22* (2006.01)

(52) U.S. Cl.
  CPC .............. *F04B 53/10* (2013.01); *F04B 53/16* (2013.01); *F04B 53/22* (2013.01)

(58) Field of Classification Search
  CPC . F04B 53/10; F04B 53/16; F04B 53/22; F16J 15/56
  See application file for complete search history.

(56) References Cited

U.S. PATENT DOCUMENTS

| | | | |
|---|---|---|---|
| 1,975,886 A * | 10/1934 | Wheeler | F16J 15/20 277/528 |
| 5,082,020 A | 1/1992 | Bailey et al. | |
| 5,249,600 A | 10/1993 | Blume | |
| 7,070,166 B1 | 7/2006 | Blume | |
| 7,540,470 B1 | 6/2009 | Blume | |
| 7,726,026 B1 | 6/2010 | Blume | |
| 8,261,767 B1 * | 9/2012 | Blume | B22F 7/08 137/902 |
| 2004/0234404 A1 | 11/2004 | Vicars | |
| 2011/0206546 A1 | 8/2011 | Vicars | |
| 2013/0318220 A2 | 11/2013 | Ardiri et al. | |
| 2014/0070127 A1 | 3/2014 | Blume | |
| 2018/0156212 A1 | 6/2018 | Ballario | |

FOREIGN PATENT DOCUMENTS

| | | |
|---|---|---|
| CN | 101265542 A | 9/2008 |
| CN | 201535244 U | 7/2010 |
| CN | 102606538 A | 7/2012 |
| CN | 102644448 A | 8/2012 |

(Continued)

OTHER PUBLICATIONS

Dec. 6, 2023 Foreign Office Action Chinese Application No. CN202010511251, 22 Pages.

(Continued)

*Primary Examiner* — Gilbert Y Lee
(74) *Attorney, Agent, or Firm* — Christopher J. Owens

(57) ABSTRACT

In one aspect, fluid ends are described herein having structure and design addressing degradation mechanisms in pumping operations employing fluids comprising abrasive particles. Briefly, a fluid end for a reciprocating pump comprises a body portion comprising a bore having an inner diameter surface, and a reciprocating plunger at least partially disposed in the bore. A sleeve is positioned within the bore between the inner diameter surface and plunger, the sleeve engaging the inner diameter surface via an interference fit.

13 Claims, 2 Drawing Sheets

(56) References Cited

FOREIGN PATENT DOCUMENTS

| | | |
|---|---|---|
| CN | 202900628 U | 4/2013 |
| CN | 103121156 A | 5/2013 |
| CN | 103540823 A | 1/2014 |
| CN | 203441975 U | 2/2014 |
| CN | 105308319 A | 2/2016 |
| CN | 106163704 A | 11/2016 |
| CN | 108343602 A | 7/2018 |
| CN | 208340830 U | 1/2019 |
| CN | 109764120 A | 5/2019 |
| WO | 2015077001 A1 | 5/2015 |

OTHER PUBLICATIONS

Jun. 12, 2024 Foreign Office Action Chinese Application No. CN202010511251.1, 15 Pages.

* cited by examiner

WEAR RESISTANT FLUID ENDS

FIELD

The present invention relates to fluid ends and associated apparatus and, in particular, to fluid ends employing wear resistant components for enhanced lifetimes.

BACKGROUND

Fluid ends of high pressure pumps often experience demanding and severe operating environments. These severe operating environments can induce premature failure in several areas of the fluid end. Failure, for example, can occur in the valve assembly due to valve and/or seat fracture resulting from repeated impacts associated with valve opening and closing. Failure can additionally occur in the packing bore due to uneven wear in the bore. In hydraulic fracturing operations, fluid passing through the fluid end includes high levels of abrasive particulate matter. This particulate matter can preferentially wear multiple areas of the packing bore, leading to washout of the internal surface of the bore.

SUMMARY

In one aspect, fluid ends are described herein having structure and design addressing degradation mechanisms in pumping operations employing fluids comprising abrasive particles. Briefly, a fluid end for a reciprocating pump comprises a body portion comprising a bore having an inner diameter surface, and a reciprocating plunger at least partially disposed in the bore. A sleeve is positioned within the bore between the inner diameter surface and plunger, the sleeve engaging the inner diameter surface via an interference fit. The interference fit can be achieved via shrink fitting, where the fluid end body is heated to expand the bore for insertion of the sleeve having diameter greater than the bore diameter. The sleeve may also be cooled to facilitate insertion into the bore. The fluid end body is then cooled producing the interference fit or shrink fit.

In another aspect, methods of inhibiting washout out described herein. In some embodiments, a method of inhibiting washout in a fluid end of a reciprocating pump comprises installing a sleeve in a bore of the fluid end via an interference fit with an inner diameter surface of the bore, wherein the bore has dimensions for receiving a reciprocating plunger.

These and other embodiments are further described in the following detailed description and description of the drawings.

DETAILED DESCRIPTION

Figure 1:
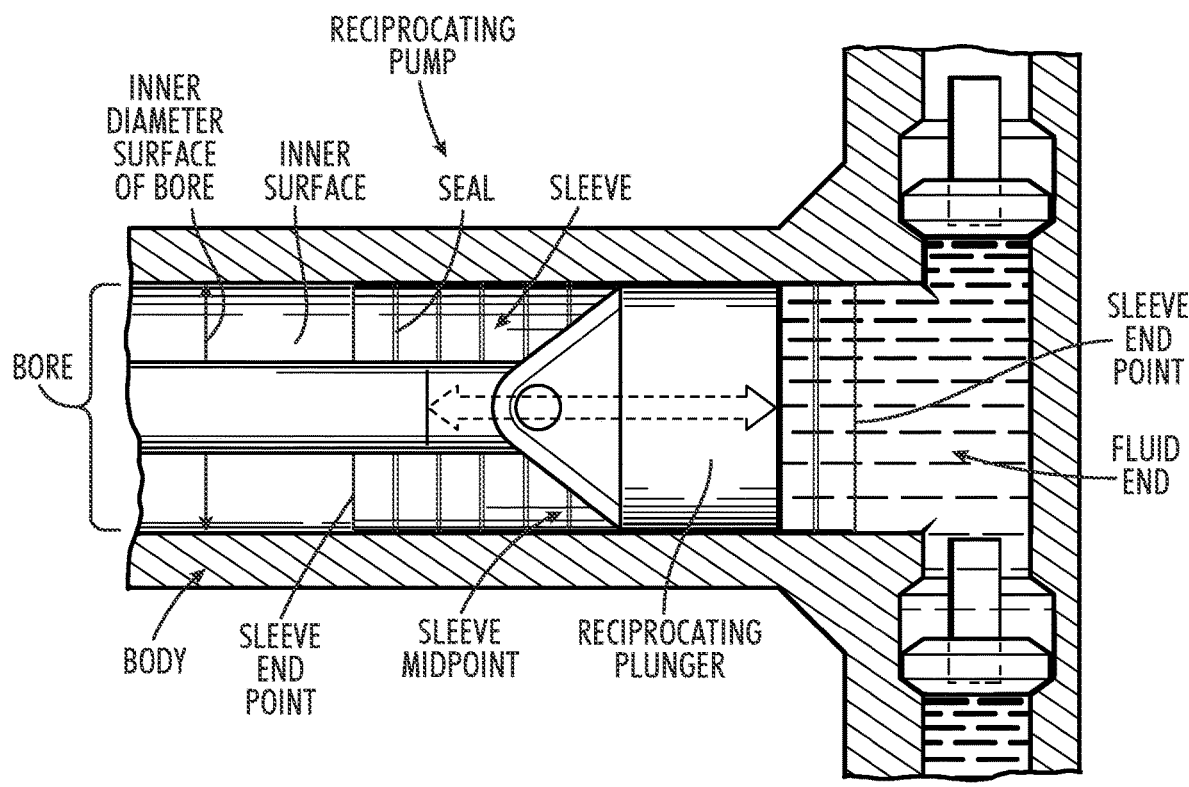
FIG. 1 depicts a fluid end of a reciprocating pump according to some embodiments described herein.
Figure 2:
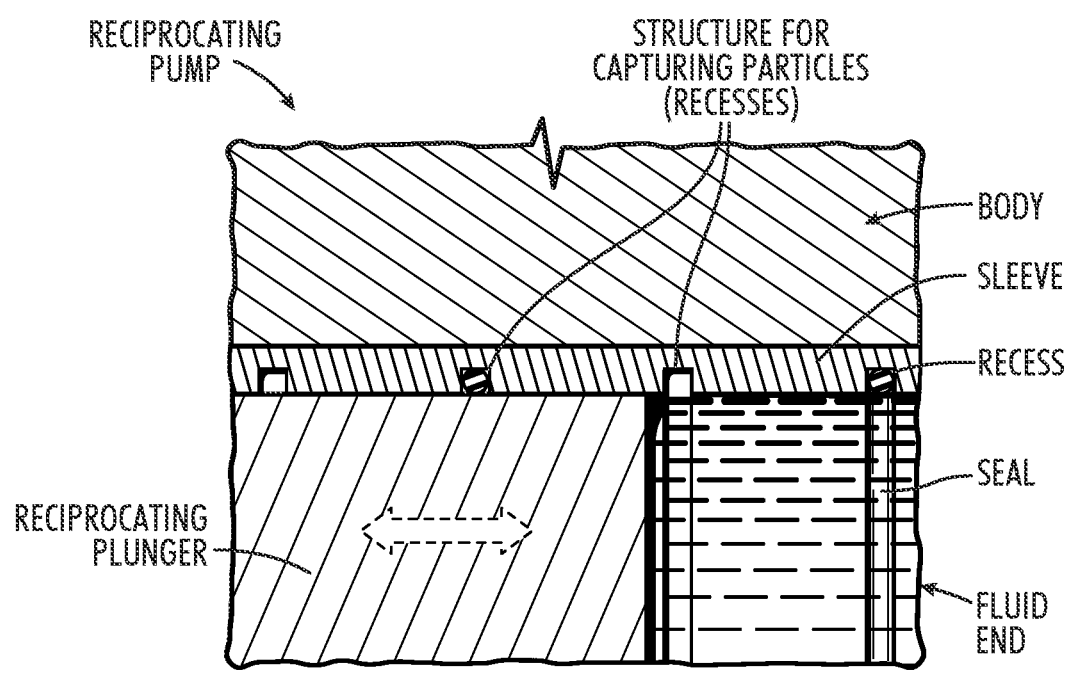
FIG. 2 is a magnified depiction of the reciprocating pump of FIG. 2.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In one aspect, a fluid end for a reciprocating pump comprises a body portion comprising a bore having an inner diameter surface, and a reciprocating plunger at least partially disposed in the bore. A sleeve is positioned within the bore between the inner diameter surface and plunger, the sleeve engaging the inner diameter surface via an interference fit. The sleeve can be formed of any material consistent with resisting or inhibiting wear of inner diameter surfaces of the bore by particles in fluid passing through the fluid end. In some embodiments, for example, the sleeve can be formed of cobalt-based alloy or nickel-based alloy. In such embodiments, the cobalt-based alloy or nickel-based alloy may further comprise hard particles imbedded therein to provide metal matrix composite. Hard particles disposed in cobalt-based alloy or nickel-based alloy matrix can comprise metal carbides, metal nitrides, metal carbonitrides, silicides, borides, metal oxides and mixtures thereof. In other embodiments, the sleeve can be formed one or more ceramic materials.

In some embodiments, the sleeve comprises sintered cemented carbide. The sleeve, for example, may be formed solely of sintered cemented carbide, in some embodiments. Sintered cemented carbide of the sleeve can comprise tungsten carbide (WC). WC can be present in the sintered carbide in an amount of at least 70 weight percent or in an amount of at least 80 weight percent. Additionally, metallic binder of cemented carbide can comprise cobalt or cobalt alloy. Cobalt binder, for example, can be present in the sintered cemented carbide in an amount ranging from 3 weight percent to 20 weight percent. In some embodiments, cobalt binder is present in sintered cemented carbide of the sleeve in an amount ranging from 5-15 weight percent or from 6-10 weight percent. Sintered cemented carbide of the sleeve can also comprise one or more additives, such as one or more of the following elements and/or their compounds: titanium, niobium, vanadium, tantalum, chromium, zirconium and/or hafnium. In some embodiments, titanium, niobium, vanadium, tantalum, chromium, zirconium and/or hafnium form solid solution carbides with WC of the sintered cemented carbide. In such embodiments, the sintered carbide can comprise one or more solid solution carbides in an amount ranging from 0.1-5 weight percent.

In some embodiments, a single grade of sintered cemented carbide can be employed to for the sleeve. In other embodiments, the sleeve may comprise two of more grades of sintered cemented carbide. Areas of the sleeve experiencing high wear, for example, can comprise sintered cemented carbide of smaller average grain size and less binder for enhancing hardness and wear resistance. Remaining areas of the sleeve can comprise sintered cemented carbide of high binder content to enhance toughness and fracture resistance of the sleeve. In some embodiments, the sintered cemented carbide sleeve is free of cracks.

In some embodiments, sintered cemented carbide forming the sleeve can have a compressive stress condition selected from Table I.

TABLE I

| Sintered Cemented Carbide Compressive Stress (GPa) |
|---|
| ≥ 1 |
| ≥ 1.5 |
| ≥ 2 |
| 0.5-3 |
| 1-3 |
| > 3 |

Compressive stress of the sintered cemented carbide may be determined via X-ray diffraction according to the $Sin^2_\psi$ method. In some embodiments, the compressive stress condition extends along a portion or the entire longitudinal axis of the sleeve. The sintered cemented carbide of the sleeve may exhibit a compressive stress condition selected from Table I prior to placement in a bore of the fluid end, in some embodiments. The sintered cemented carbide sleeve, for example, may be mechanically worked prior to installation in the fluid end bore. Mechanical working can include blasting and/or grinding the sleeve to the desired dimensions and/or surface roughness. Such mechanical working can impart the compressive stress condition to the sleeve prior to bore installation.

A compressive stress condition of the sintered cemented carbide may also result from the interference when the sleeve is installed in the bore of the fluid end. In some embodiments, the sintered cemented carbide sleeve exhibits a compressive stress gradient when installed in a fluid end bore. The compressive stress gradient, for example, can extend along a longitudinal axis of the sleeve, wherein compressive stresses are higher at ends of the sleeve relative to a midpoint of the sleeve. In some embodiments, a first end of the sintered cemented carbide sleeve has a higher compressive stress than the second end of the sleeve. Additionally, in some embodiments, the sintered cemented carbide sleeve can exhibit a cross-sectional compressive stress gradient when installed in a bore of the fluid end. Compressive stress of the sleeve, for example, can increase in a direction extending from the outer diameter surface to the inner diameter surface. Alternatively, compressive stress of the sleeve may increase in a direction extending from the inner diameter surface to the outer diameter surface.

As described herein, the sleeve engages the inner diameter surface of the fluid end bore via an interference fit. In some embodiments, interference of the bore/sleeve assembly is 0.008-0.015 inches. Interference amount can be selected according to several considerations including, but not limited to, specific material compositions of the bore and sleeve and the desired amount of compression of the sleeve after shrink fitting. In some embodiments, the inner diameter surface of the bore is steel, including stainless steel. Generally, the interference pressure between the sleeve and bore is higher than the pressure inside the fluid end.

Additionally, the sleeve can comprise one or more recesses for receiving one or more seals. A packing assembly, for example, may be positioned between the inner surface of the sleeve and reciprocating plunger to seal the bore. The inner surface of the sleeve may contain a single recess for receiving seals of the packing assembly. Alternatively, the inner surface of the sleeve may comprise multiple recesses for receiving seals of the packing assembly. Seals interfacing with recesses of the sleeve can have dimensions for extending out of the recesses for maintaining sealing with the reciprocating plunger. In some embodiments, a subset of the seals are received in a recess of the sleeve with the remaining seals not associated with a recess. One or more interior recesses of the sleeve can assist in maintaining position of the seals during high pressure operations of the fluid end and associated pumping apparatus. Interior surfaces of the sleeve, in some embodiments, can comprise structures for capturing particles from fluid passing through the fluid end. Such structures can include recesses and/or baffles. Abrasive particle build up on interior surfaces of the sleeve can enhance wear resistance of the sleeve.

In another aspect, methods of inhibiting washout out described herein. In some embodiments, a method of inhibiting washout in a fluid end of a reciprocating pump comprises installing a sleeve in a bore of the fluid end via an interference fit with an inner diameter surface of the bore, wherein the bore has dimensions for receiving a reciprocating plunger. The fluid end and sleeve can have any composition, structure and/or properties described hereinabove. In some embodiments, the sleeve is applied to a virgin fluid end at the time of manufacture. Alternatively, the sleeve may be inserted into the packing bore of a used fluid end. The diameter of the packing bore, for example, can be increased prior to shrink fitting the sleeve within the bore. The bore diameter can be increased by machining, in some embodiments. In this way, the lifetimes of existing fluid end bodies can be increased.

The sleeve can be made according to one of several methods. Specific method of making the sleeve can be dependent on several considerations, including composition of the sleeve and design features of the sleeve. In some embodiments, the sleeve can be molded. A mold can be filled with powder alloy or carbide grade powder, and the powder is subsequently sintered in the mold. In other embodiments, the sleeve can be fabricated by one or more additive manufacturing techniques, such as selective laser sintering (SLS) or binder jetting followed by one or more sintering operations.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A fluid end of a reciprocating pump comprising:
   a body portion comprising a bore having an inner diameter surface;
   a reciprocating plunger at least partially disposed in the bore; and
   a sleeve positioned within the bore between the inner diameter surface and plunger, the sleeve engaging the inner diameter surface via an interference fit, and the sleeve comprising sintered cemented carbide, wherein the sintered cemented carbide exhibits a compressive stress gradient extending along a longitudinal axis of the sleeve, and wherein compressive stresses of the sintered cemented carbide are higher at ends of the sleeve relative to a midpoint of the sleeve; and
   one or more seals between the sleeve and the reciprocating plunger, wherein a surface of the sleeve comprises one or more recesses for receiving the one or more seals.

2. The fluid end of claim 1, wherein the inner diameter surface is steel.

3. The fluid end of claim 1, wherein the sintered cemented carbide comprises 10-20 weight percent metallic binder.

4. The fluid end of claim 1, wherein the sintered cemented carbide exhibits a compressive stress condition of at least 0.5 GPa prior to installation of the sleeve in the bore.

5. The fluid end of claim 1 having an amount of interference of 0.008-0.015 inches.

6. The fluid end of claim 1, wherein a surface of the sleeve comprises structures for capturing particles from fluid passing through the fluid end.

7. The fluid end of claim 1, wherein the sintered cemented carbide is free of cracks.

8. The fluid end of claim 1, wherein the one or more seals are comprised of rubber.

9. A method of inhibiting washout in a fluid end of a reciprocating pump comprising:
   installing a sleeve in a bore of the fluid end via an interference fit with an inner diameter surface of the bore, wherein the bore has dimensions for receiving a reciprocating plunger, and wherein the sleeve comprises sintered cemented carbide, wherein the sintered cemented carbide exhibits a compressive stress gradient extending along a longitudinal axis of the sleeve, and wherein compressive stresses of the sintered cemented carbide are higher at ends of the sleeve relative to a midpoint of the sleeve, and one or more seals are positioned between the sleeve and the reciprocating plunger, wherein a surface of the sleeve comprises one or more recesses for receiving the one or more seals.

10. The method of claim 9, wherein the inner diameter surface is steel.

11. The method of claim 9, wherein a surface of the sleeve comprises structures for capturing particles from fluid passing through the fluid end.

12. The method of claim 9, wherein the sintered cemented carbide is free of cracks.

13. The method of claim 9, wherein the one or more seals are comprised of rubber.

* * * * *